May 8, 1945. N. REKOSH 2,375,439
ELECTRIC WELDING MACHINE
Filed Feb. 14, 1944
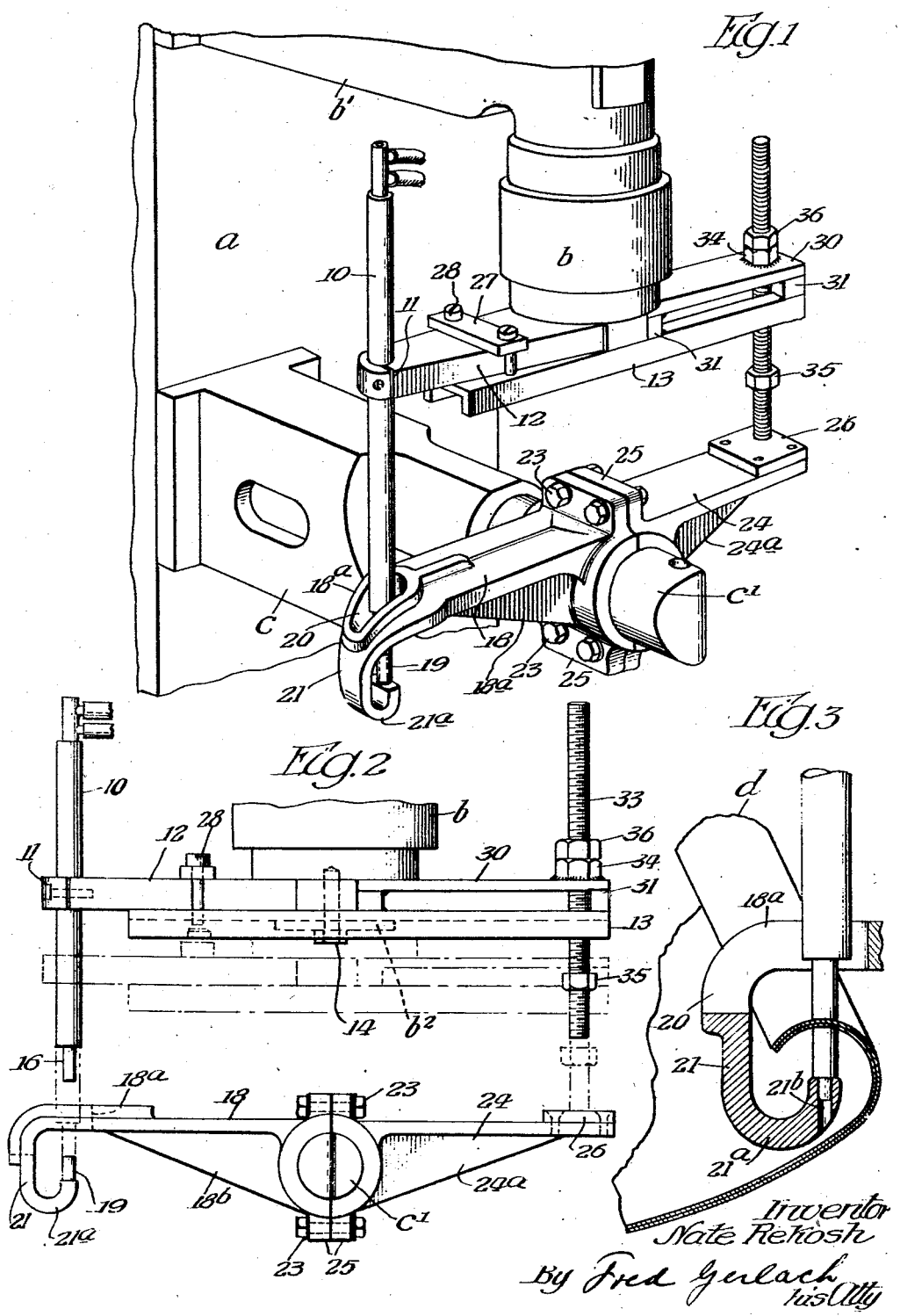
Inventor
Nate Rekosh
By Fred Gerlach
his Atty Patented May 8, 1945

2,375,439

UNITED STATES PATENT OFFICE 2,375,439

ELECTRIC WELDING MACHINE

Nate Rekosh, Miami Springs, Fla., assignor to Consolidated Vultee Aircraft Corporation, San Diego, Calif., a corporation of Delaware Application February 14, 1944, Serial No. 522,273

5 Claims. (Cl. 219—4)

The invention relates to welding machines.

In welding non-ferrous metals, such as aluminum and magnesium alloys, a high pressure is required against the work between the electrodes for welding. One of the electrodes, usually the upper, is carried by an arm which is operable to and from an electrode, usually the lower, which is also carried by an arm. The upper electrode is usually shiftable by mechanism, such as a hydraulic ram, and is operated to exert high pressure against the lower electrode. The upper electrode and the welding tip of the lower electrode are offset a considerable distance from the ram to provide room for the work being welded.

Where the high pressures necessary in welding non-ferrous metals, such as aluminum base or magnesium alloys, are used and the lower or stationary welding tip is carried by the arm, said pressures cause the arm to yield around its support and this causes angular variation between the contact faces of the electrodes during the welding periods. Such relative movement causes "flashing" which burns the work or the electrodes, and inferior welds.

One object of the invention is to provide a welding machine by which a counter pressure will be exerted on the fixed electrode during the welding periods to minimize relative angular movement between the electrodes during the application of welding current to prevent "flashing" which may burn the work or the electrodes or an inferior weld.

In welding engine cowling for aircraft which is usually provided with a radially curved inturned leading edge it is desirable to provide a welding machine which is adapted to weld the leading edge, which is usually shaped on a small radius to avoid the necessity of riveting the sections of the cowling together, and for this purpose it is desirable to provide upper and lower electrodes between which the edge of the cowling can be welded and which are disposed at one side of the welding machine so that cowling which has a large overall diameter can be conveniently manipulated for welding. Another object of the invention is to provide an improved machine which is adapted for welding beads on the leading edge of cowling having a small radius.

Other objects of the invention will appear from the detailed description.

The invention consists in the several novel features hereinafter set forth and more particularly defined by claims at the conclusion hereof.

In the drawing:

Fig. 1 is a perspective of a welding machine embodying the invention.

Fig. 2 is a front elevation.

Fig. 3 is a vertical section illustrating the manner in which the leading edge of cowling is welded.

The invention is exemplified in a welding machine which comprises, generally, a main frame or housing $a$, a hydraulic ram $b$, suitably supported from the rear, on the main frame $a$ by a bracket $b'$, and a lower support $c$ which has its rear end fixedly secured on the frame $a$ and carries at its front end a stud $c'$ which functions as a holder for the lower electrode. The support $c$ extends forwardly from the frame $a$ and the stud $c'$ is positioned centrally under the ram $b$. The ram $b$ shifts the upper electrode and applies the necessary pressure to the work between the electrodes for welding. The parts thus far described may be of usual construction.

The upper electrode 10 is movable, extends vertically, and is removably and adjustably secured by a suitable clamp 11 in the outer end of an arm 12 which functions as a holder for said electrode, connects said electrode to the welding circuit, and is movable by the ram. Arm 12 extends crosswise of the front of the machine and to one side of the axis of the ram. The lower end of electrode 10 is provided with a welding tip 16. A channel bar 13 is fixedly secured against the under side of holder-arm 12 by a screw 14 and washer $b^2$. Bar 13 underlaps the holder-arm 12 and is also secured to said arm by a clamping bar 27 and screws 28. The bar 13 extends away from the ram in a direction opposite from the arm 12. The bar 13 extends across the axis of the ram in a direction substantially parallel to the holder-arm 12 and at its opposite end is reinforced by a plate 30 which is welded to blocks 31 which are welded to the upper face of bar 13. A nut 34 is welded to the bar 30 and a screw-post 33 is threaded to said nut for vertical adjustment of its lower end. A nut 35 is welded to the screw-post 33 for turning and adjusting said post. A lock nut 36 is adapted to secure the post in its adjusted position in the bar 30. The holder-arm 12 and bar 13 constitute a carrier structure which is operable by the ram for applying pressure to the work, which extends to opposite sides of the ram on which the structure is supported, and by which the electrode 10 and the screw-post 33 are operated vertically on opposite sides of the ram. The holder-arm 12 carries the electrode at one side of the ram and the bar 13 functions as a member on the opposite side of the ram for operating the stud 33 to apply a counter pressure to the lower electrode as hereinafter described.

A lower arm 18 functions as a part of the lower electrode and is provided at its outer end with a removable welding tip 19. Arm 18 is secured to the stud c' which functions as an electrode holder for said arm and through which said arm is connected to the welding circuit. Arm 18 extends under the holder arm 12 for the upper electrode 10 and in the same direction as the arm 12. Arm 18 has its inner end provided with a semi-circular recess fitting against one side of stud c' and is clamped to said stud by an extension arm or member 24 which has an opposite cylindrical seat and bolts 23 which extend through mating lugs 25 on the arm 18 and member 24. Member 24 functions as a rigid extension of the arm 18 at the opposite side of the stud c', is aligned crosswise of the machine with arm 18, and extends under the extension member formed by the bar 13 in the upper carrier structure. The outer end of member 24 has affixed thereto an insulation pad 26 which is engageable by the screw-post 33 which moves with the upper electrode and is shifted by the ram. Arm 18 and member 24 exemplify a structure which extends crosswise of the machine, extends to the opposite sides of stud c', and whereby pressure against the pad 26 on the outer member 24 will exert a counter pressure or balancing pressure on the arm 18 and welding tip 19 against the work at the welding spot. This counterpressure applied to arm 18 and welding tip 19 resists relative angular movement between the welding tip of the upper and lower electrodes.

Arm 18 is provided with an integral downturned outer end 21 and with an elongated slot 20 extending through the upper and outer corner between arm 18 and end 21. The end 21 has an inward semi-circularly curved lower portion 21ᵃ which terminates in an upwardly facing seat for a shoulder on the welding tip 19. The portion of the tip 19 below said shoulder fits in a socket 21ᵇ which extends through the inner end of the curved portion 21ᵃ of arm 18. The outer portion of arm 18 is provided with an integral reinforcing rib 18ᵃ which extends around slot 20 and on the upper face of the arm 18. Arm 18 is provided between its inner end and the slot 20 with an integral longitudinal reinforcing rib 18ᵇ and extension-member 24 is provided with an integral reinforcing rib 24ᵃ so that said arm and said extension member will be rigid for the transmission of pressure stresses.

The holder-arm 12 for the upper electrode and arm 18 which functions as a holder for the lower electrode tip are preferably formed of a suitable copper alloy having suitable resistance which will withstand high working temperature, is resistant to electrolytic and galvanic action, and which is adapted to withstand working pressures exerted by the hydraulic ram b of as high as 750 to 1100 lbs. without distortion for efficiently welding work formed of aluminum or magnesium alloys, and are respectively connected to a welding generator circuit as well understood in the art. The electrodes may be water cooled in any manner as well understood in the art. The extension member 30 is removable from the ram. The electrode arm 18 and the extension member 24 thereon are removable from the stud c' for replacement with electrodes for different types of work.

The operation of the machine will be as follows: the work, for example the leading edge beading usually with doubler strips for reinforcing or lapping the butt fit between sections of an engine cowling d, is inserted over the welding tip 19 into the space between the outer end 21 of arm 18 while ram b and upper electrode 10, arm 12, extension member 13, and screw-post 33 are in their raised position. The work is spotted on the welding tip 19 and the ram is then operated to lower electrode 10, arm 12, extension member 13, and post 33. As the upper electrode is lowered to its welding position, the ram will lower the post 33 so that its lower end will abut against the pad 26 and positively apply a downward pressure on the extension arm 24. The welding current is then passed through the electrodes. This downward pressure produces an upward pressure in the outer end of the electrode arm 18 and against the work, and a counter pressure to, or balancing pressure for, that exerted by the upper electrode against the work, which prevents relative angular movement of the faces of the welding tips resulting from angular movement of the arm 18 around stud c'. The screw-post 33 can be adjusted to time the application of downward pressure to the extension arm 24 and the upward pressure of the outer end of arm 18 for work of different thickness.

The welding of the leading edge bead of a small radius on an engine cowling is illustrated in Fig. 3. The hooked form of the outer end of electrode arm 18 permits all portions of the bead to be spotted between the electrodes. The electrodes are positioned at one side of the welding machine so that the cowling can be tilted for this purpose. The integral formation of the arm 18, and its reinforced hook-shaped outer end around the slot through which the upper electrode passes, provides a strong support for the work and by the use of the downward pressure on the extension arm it is possible to weld leading edge beads under extremely high pressures.

The invention exemplifies a welding machine in which the welding points are supported at the ends of arms, one of which is movable to the other, and means for applying counter or balancing pressure to the lower electrode during the welding operations. The invention also exemplifies a machine provided with a lower electrode arm adapted for welding work having small radial cross-sections, and which is adapted to provide such counter or balancing pressure on the arm adapted for such work.

The invention is not to be understood as restricted to the details set forth, since these may be modified within the scope of the appended claims without departing from the spirit and scope of the invention.

Having thus described the invention, what I claim as new and desire to secure by Letters Patent is:

1. An electric welder comprising a rectilinearly slidable structure including a ram, an upper arm and an extension member rigid with and extending outwardly in opposite directions from the ram; an electrode carried by the free end of the upper arm; a stationary support below the ram; and a lower electrode-arm and an extension member rigid with and stationarily mounted on said support and extending outwardly from said support in opposite directions, correspondingly to the upper arm and its extension; the extensions being provided with rigid abutments for transmitting positive, counter or balancing pressure from the ram to the lower arm during welding periods.

2. An electric welder comprising a rectilinearly slidable structure, including a ram, an upper arm and an extension member rigid with and extending outwardly in opposite directions from the ram; an electrode carried by the free end of the upper arm; a stationary support below the ram; and a lower electrode arm and an extension member, rigid with and stationarily mounted on said support and extending outwardly from said support in opposite directions, correspondingly to the upper arm and its extension; the extensions being provided with rigid abutments for transmitting positive, counter or balancing pressure from the ram to the lower arm during welding periods, one of said abutments being adjustable for work of different thickness.

3. An electric welder comprising a rectilinearly slidable structure including a ram, an upper arm and an extension member rigid with and extending outwardly in opposite directions from the ram; an electrode carried by the free end of the upper arm; a stationary support below the ram; and a lower electrode arm and an extension member rigid with and stationarily mounted on said support and extending outwardly from said support in opposite directions correspondingly to the upper arm and its extension; one of the extensions being provided with a rigid abutment, and the other with an adjustable screw for transmitting positive, counter or balancing pressure from the ram to the lower arm during welding periods.

4. An electric welder comprising a supporting frame; a ram supported by the frame for rectilinear sliding movement; an upper arm and an extension member, rigid and rectilinearly movable with and extending outwardly from the opposite sides of the ram; an electrode carried by said upper arm, a supporting stud rigidly supported on and projecting from the frame below the center of the ram; and a lower electrode arm and an extension-member rigidly secured thereto, stationarily mounted on and extending outwardly from opposite sides of the stud and correspondingly to the upper arm and extension-member; said extension members being provided with abutments for transmitting positive counter or balancing pressure from the ram to the lower electrode-arm during the welding periods.

5. An electric welder comprising a supporting frame; a ram supported by the frame for rectilinear sliding movement; an upper arm and an extension-member, rigid, rectilinearly movable with and extending outwardly from the opposite sides of the ram; an electrode carried by said upper arm; a supporting stud rigidly supported on and projecting from the frame below the center of the ram; a lower electrode arm and an extension-member rigidly secured thereto, extending outwardly from opposite sides of the stud and under the upper arm and extension member; and means for clamping the lower extension on the stud; the extensions being provided with abutments for transmitting positive, counter or balancing pressure from the ram to the lower electrode arm during the welding periods.

NATE REKOSH.